(12) United States Patent
Lashmore et al.

(10) Patent No.: US 7,714,798 B2
(45) Date of Patent: May 11, 2010

(54) NANOSTRUCTURED ANTENNAS AND METHODS OF MANUFACTURING SAME

(75) Inventors: David S. Lashmore, Lebanon, NH (US); Peter Antoinette, Nashua, NH (US)

(73) Assignee: Nanocomp Technologies, Inc., Concord, NH (US)

( * ) Notice: Subject to any disclaimer, the term of this patent is extended or adjusted under 35 U.S.C. 154(b) by 805 days.

(21) Appl. No.: 11/592,894

(22) Filed: Nov. 3, 2006

(65) Prior Publication Data

US 2007/0257859 A1 Nov. 8, 2007

Related U.S. Application Data

(60) Provisional application No. 60/733,452, filed on Nov. 4, 2005.

(51) Int. Cl.
 *H01Q 1/36* (2006.01)
 *H01Q 21/00* (2006.01)
(52) U.S. Cl. .............................. 343/897; 343/893
(58) Field of Classification Search ............... 343/702, 343/893, 897
 See application file for complete search history.

(56) References Cited

U.S. PATENT DOCUMENTS

| | | | | |
|---|---|---|---|---|
| 4,384,944 | A | 5/1983 | Silver et al. | 204/159.13 |
| 4,572,813 | A | 2/1986 | Arakawa | 264/29.2 |
| 4,987,274 | A | 1/1991 | Miller et al. | 174/102 |
| 5,168,004 | A | 12/1992 | Daumit et al. | 428/221 |
| 6,036,774 | A | 3/2000 | Lieber et al. | 117/105 |
| 6,265,466 | B1 | 7/2001 | Glatkowski et al. | 523/137 |
| 6,333,016 | B1 | 12/2001 | Resasco et al. | 423/447.3 |
| 7,048,999 | B2 | 5/2006 | Smalley et al. | 428/367 |
| 7,205,021 | B2 * | 4/2007 | Crowley | 427/162 |
| 2002/0085968 | A1 | 7/2002 | Smalley et al. | |
| 2002/0090330 | A1 | 7/2002 | Smalley et al. | |
| 2002/0090331 | A1 | 7/2002 | Smalley et al. | |
| 2002/0094311 | A1 | 7/2002 | Smalley et al. | |
| 2002/0098135 | A1 | 7/2002 | Smalley et al. | |
| 2002/0102196 | A1 | 8/2002 | Smalley et al. | |
| 2002/0113335 | A1 | 8/2002 | Lobovsky et al. | 264/184 |
| 2002/0127162 | A1 | 9/2002 | Smalley et al. | |
| 2002/0127169 | A1 | 9/2002 | Smalley et al. | |
| 2002/0136681 | A1 | 9/2002 | Smalley et al. | 423/447.2 |
| 2002/0136683 | A1 | 9/2002 | Smalley et al. | |
| 2002/0150524 | A1 | 10/2002 | Smalley et al. | |

(Continued)

OTHER PUBLICATIONS

R.T.K. Baker et al., "*Nucleation and Growth of Carbon Deposits from the Nickel Catalyzed Decomposition of Acetylene*", Journal of Catalysis, 26:51-62 (1972).

(Continued)

*Primary Examiner*—Shih-Chao Chen
(74) *Attorney, Agent, or Firm*—Chinh H. Pham; Greenberg Traurig, LLP (57) ABSTRACT

An antenna for the transmission and reception of electromagnetic radiation is provided. The antenna includes a body portion, which can be flexible to permit incorporation of the antenna into a material. The antenna also includes an aggregate of extended length nanotubes along the body portion, and a plurality of contact points between adjacent nanotubes to permit transmission of electromagnetic radiation, while reducing resistivity along the antenna at a high frequency, for example, above 100 MHz. A method of manufacturing an antenna is also provided.

41 Claims, 2 Drawing Sheets

U.S. PATENT DOCUMENTS

| | | | |
|---|---|---|---|
| 2002/0159943 | A1 | 10/2002 | Smalley et al. |
| 2003/0036877 | A1 | 2/2003 | Schietinger ................ 702/134 |
| 2003/0109619 | A1 | 6/2003 | Keller et al. ................ 524/440 |
| 2003/0165648 | A1 | 9/2003 | Lobovsky et al. .......... 428/36.9 |
| 2003/0222015 | A1 | 12/2003 | Oyama et al. .......... 210/500.21 |
| 2004/0053780 | A1 | 3/2004 | Jiang et al. ................ 502/182 |
| 2004/0096389 | A1 | 5/2004 | Lobovsky et al. ........ 423/447.1 |
| 2004/0107796 | A1 | 6/2004 | Kumar et al. |
| 2005/0006801 | A1 | 1/2005 | Kinloch et al. ................ 264/5 |
| 2005/0074569 | A1 | 4/2005 | Lobovsky et al. .......... 428/36.9 |
| 2005/0170089 | A1 | 8/2005 | Lashmore et al. ........ 427/248.1 |
| 2005/0249656 | A1 | 11/2005 | Smalley et al. |
| 2005/0260120 | A1 | 11/2005 | Smalley et al. |
| 2005/0271829 | A1 | 12/2005 | Kumar et al. |
| 2006/0198209 | A1 | 9/2006 | Tran |
| 2007/0151744 | A1 | 7/2007 | Chen ......................... 174/110 |
| 2009/0251371 | A1* | 10/2009 | Burke .................... 343/700 R |

OTHER PUBLICATIONS

H.W. Kroto et al., "*C60: Buckminsterfullerene*", Letters To Nature, 318:162-163, (1985).

Sumio Iijima, "*Helical microtubules of graphitic carbon*", Letters to Nature, 354:56-58, (1991).

D.S. Bethune et al., *Cobalt-catalyzed growth of carbon nanotubes with single-atomic-layer walls*, Letters to Nature, 363:605-607 (1993).

M. Jose-Yacaman et al., "*Catalytic growth of carbon microtubules with fullerene structure*", Applied Physics Letters, 62(6):657-659 (1993).

Gun-Do Lee et al, "*Catalytic decomposition of acetylene on Fe(001): A first-principles study*", The American Physical Society, Physical Review B66 081403R:1-4 (2002).

N. Seo Kim et al., "*Dependence of the Vertically Aligned Growth of Carbon Nanotubes on the Catalysts*", The Journal of Physical Chemistry, 106(36):9286-9290 (2002).

H. W. Zhu et al., "*Direct Synthesis of Long Single-Walled Carbon Nanotube Strands*", Science, 296:884-886 (2002).

Ki-Hong Lee et al., "*Control of growth orientation for carbon nanotubes*", Applied Physics Letters, 82(3): 448-450, (2003).

E. F. Kukovitsky et al., "*CVD growth of carbon nanotube films on nickel substrates*", Applied Surface Science, 215:201-208 (2003).

Gou, J.G., "*Single-Walled Carbon Nanotube Bucky Paper/Epoxy Composites: Molecular Dynamics Simulation and Process Development*", PhD dissertation, The Florida State University, 2002, p. 9-126.

PCT International Search Report based on PCT/US06/043470 dated Jul. 7, 2008.

* cited by examiner

NANOSTRUCTURED ANTENNAS AND METHODS OF MANUFACTURING SAME

RELATED U.S. APPLICATION(S)

This application claims priority to U.S. Provisional Patent Application Ser. No. 60/733,452, filed Nov. 4, 2005, which application is hereby incorporated herein by reference.

TECHNICAL FIELD

The present invention relates to nanostructures, and more particularly, to extended length nanotubes and/or nanotube aggregates for use as an antenna or sensor for the transmission and reception of electromagnetic radiation.

BACKGROUND ART

Antennas for transmission and reception need to provide high fidelity information on the nature of the signals received or transmitted. These signals can be distorted in a number of ways, including by the design of the antenna, through its frequency band of operation, and by the manner in which the antenna may be mounted. In addition, signal distortion may be caused by the materials from which the antenna is made. For instance, the materials from which the antenna is made may cause phase distortion. Phase distortion is typically frequency dependent and can be set up by surface currents induced in conductors by high frequency AC fields. However, the resistance provided by such materials is usually isotropic in nature. As a result, the signal is attenuated along the length of the antenna, as well as across the narrow diameter of the antenna.

The materials from which the antenna is made may also give rise to the occurrence of surface currents. Typically, surface currents can be inducted in high frequency transmission of information. The presence of surface currents can lead to frequency related phase shifts with the potential to distort or degrade transmitted information.

The materials from which the antenna is made can further enhance the thermal signature of the antenna. In particular, the material used can affect the resistivity and limit the current carrying capacity in the antenna. As a result, when a relatively high amount of currents is being carried along the antenna, the antenna may heat up, thereby increasing the thermal signature of the antenna. Such enhancement in the thermal signature, under most circumstances can be undesirable and the thermal energy expended is a waste of power.

It is believed that carbon nanotubes may have properties that potentially can overcome these problems and further offer the promise of much higher power radiated per input power. Nanotubes have been known for some time. Examples of literature disclosing nanotubes include, J. Catalysis, 37, 101 (1975); Journal of Crystal Growth 32, 35 (1976); "Formation of Filamentous Carbon", Chemistry of Physics of Carbon, ed. Philip L. Walker, Jr. and Peter Thrower, Vol. 14, Marcel Dekker, Inc, New York and Basel, 1978; and U.S. Pat. No. 4,663,230, issued Dec. 6, 1984. More recent interest in carbon filamentary material was stimulated by a paper by Sumio Iijima in Nature 354, 56 (1991) also describing synthesis and structure of carbon nanotubes. These early studies and the work that has developed from these studies resulted in a material with remarkable mechanical and electronic properties. However, the nanotubes that these studies produced have been relatively short and can be limited for composite material reinforcement or for spinning into yarns or filaments for use as antennas. In addition many of these early carbon nanotubes were encrusted with amorphous carbon thereby degrading their usefulness.

Present commercial methods for the manufacture of nanotubes can generate only relatively short length nanotubes. Lengths typically may vary from a few nanometers (e.g., 10 nm) to only tens of microns in length. As a consequence, antennas manufactured from these relatively short length nanotubes can result in inefficient conduction from one relatively short nanotube to another. Conduction from short structure to short structure can lead to relatively high resistivity along the length of the antenna, and can also preclude using ballistic conduction potential of these materials. Further, the shorter tubes produce weaker yarns so handling and attaching to this material may be difficult.

Accordingly, it would be desirable to provide an antennas which can minimize signal distortion, including phase distortion, and phase shifts caused by surface currents, minimize thermal signature under very high power, while at the same time providing substantially enhanced conduction.

SUMMARY OF THE INVENTION

The present invention, in an embodiment, is directed to an antenna for the transmission and reception of electromagnetic radiation. The antenna includes a body portion that can be flexible to permit weaving or embedding of the antenna into fabric, cloth or any other material. The antenna also includes an aggregate of extended length nanotubes along the body portion. In an embodiment, the aggregate may have a length ranging from a few nanometers to over a meter or more. The aggregate may be designed to transmit and receive high frequency electromagnetic radiation, for instance, over 100 MHz, enhance ballistic conduction, minimize surface currents in order to minimize signal distortion, and/or minimize thermal signature along the body portion. In an embodiment, the aggregate may include a polymeric resin dispersed there throughout to maintain the integrity of aggregate. The antenna further includes a plurality of contact points between adjacent nanotubes to permit transmission of electromagnetic radiation while reducing resistivity in the antenna at high frequencies. The antenna of the present invention can be designed to be elongated in shape, as a loop, as an array, or any other geometric shape.

The present invention further provides a method for manufacturing an antenna for the transmission and reception of electromagnetic radiation. The method, in one embodiment, includes initially providing a plurality of extended length nanotubes. These nanotubes, of course, can be generated by a variety of methods known in the art, including chemical vapor deposition, or can be obtained from any commercially available source. Next, the nanotubes can be aggregated so as to provide a plurality of contact points between adjacent nanotubes to permit transmission of electromagnetic radiation, while reducing resistivity at a high frequency. In aggregating the nanotubes, the nanotubes can be permitted interact with one another through intermolecular forces, such as van der Waal's force to maintain the integrity of the aggregate. Alternatively, a polymeric resin may be dispersed throughout the aggregate to maintain its integrity. Thereafter, the aggregate may be manipulated into a desirable shape for use as an antenna.

DESCRIPTION OF SPECIFIC EMBODIMENTS

Carbon nanostructures, such as carbon nanotubes, for use in the manufacturing of an antenna or sensor of the present invention may be fabricated using a variety of approaches. Presently, there exist multiple processes and variations thereof for growing carbon nanotubes. These include: (1) Chemical Vapor Deposition (CVD), a common process that can occur at near ambient or at high pressures, (2) Arc Discharge, a high temperature process that can give rise to tubes having a high degree of perfection, and (3) Laser ablation.

At present, CVD appears to be one of the more attractive approaches from a commercial standpoint for fabricating carbon nanotubes. However, since growth temperatures for CVD can be comparatively low ranging, for instance, from about 600° C. to about 1300° C., carbon nanotubes, both single wall (SWNT) or multiwall (MWNT), may be grown, in an embodiment, from nanostructural catalyst particles supplied by reagent carbon-containing gases (i.e., gaseous carbon source).

Examples of catalyst particles that may be used in connection with CVD include ferromagnetic transition metals, such as iron, cobalt, nickel, oxides, nitrates or chlorides of these metals. In certain instances, these catalyst particles may be combined with molybdenum or ceramic carriers or with each other. In the case of oxides, the oxides may be reduced to metallic form, as a result of the excess of hydrogen present in these reactions.

Suitable carbon-containing gases for the CVD process, in one embodiment, can include acetylene, methane, ethylene, ethanol vapor, methanol vapor and the like.

Although there exist a variety of CVD processes, an example of a CVD process that can be used in connection with the present invention is disclosed in U.S. Patent Application Publication US 2005/0170089, which application is hereby incorporated herein by reference.

Figure 1A:
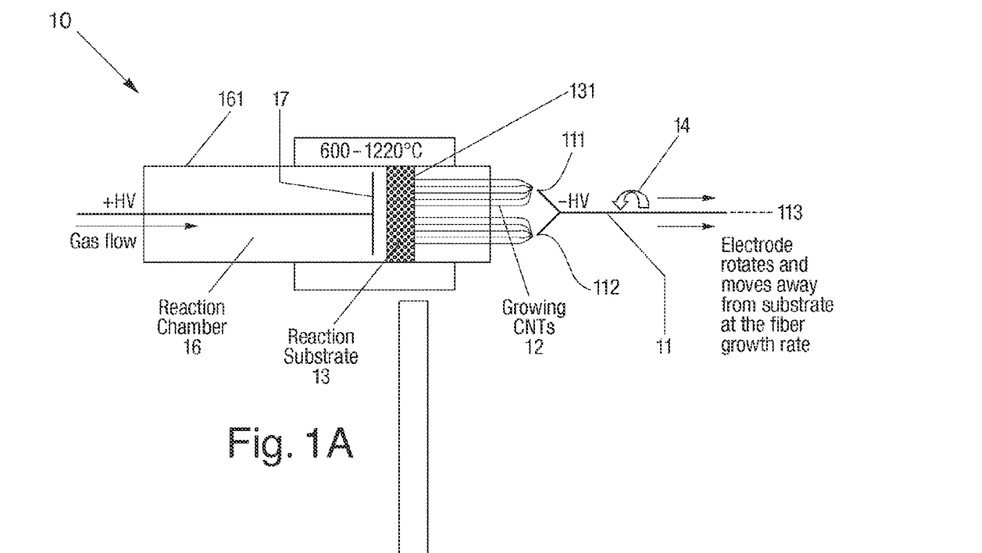
FIGS. 1A-B illustrate an apparatus and the steps used in spinning and extracting continuously growing nanoscale tubes or fibers into a yarn.
Figure 1B:
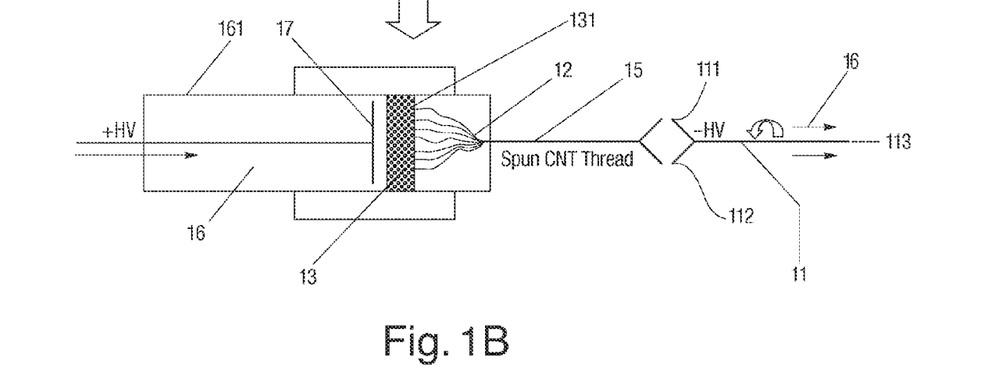

In particular, a system 10 for synthesizing continuous, extended length nanostructures, for instance, nanotubes is provided. With reference to FIGS. 1A-B, a substrate 13, in one embodiment, may be situated in a reaction chamber 16 made from, for instance, a quartz or alumina tube 161. Carbon containing gas introduced into the chamber 16 may move along the tube 161 toward the substrate 13. In an embodiment, the substrate 13 may be porous and may include a plurality of catalyst particles on its downstream surface 131. Examples of a suitable catalyst include, ferrocene, iron nano-particles, iron pentacarbonyl, nano-particles of magnetic transition metals, such as, cobalt, cobalt hexacarbonyl, nickel, nickel hexacarbonyl, molybdenum or their alloys, or oxides, nitrates or chlorides of these metals or any combination of the oxides or other reducible salts (e.g., iron ammonium sulfate or iron chloride) or organometallic compounds of these metals. Carbon containing gas flowing along the chamber 16 may subsequently pass through the porous substrate 13 and over the catalyst particles to initiate carbon nanotube growth. Catalyst, gas chemistry, and free energy (e.g., heat) conditions may be provided at various levels to induce the formation of continuous, extended length nanotubes.

The system 10 may also be provided, in one embodiment, with a two-pole electrode 11 so that fibers 12 (e.g., nanotubes) generated from substrate 13 can be attracted thereto. As illustrated in FIG. 1A, some of the fibers 12 may be attracted to one pole on prong 111 while some of the fibers 12 may be attracted to the other pole on prong 112. With the fibers 12 attracted to prongs 111 and 112 of electrode 11, the electrode 11 may be spun in the direction of arrow 14, so that fibers 12 may be caused to wrap around one another to make a yarn 15 (FIG. 1B) or aggregate of extended carbon nanotubes. As the electrode 11 continues to spin, it may also be caused to move away from the substrate 13 to continuously pull the yarn 15 away from the substrate 13. In one embodiment, the rate of rotation of the electrode 11 and the rate of pull may be controlled and set to substantially match the rate of growth of the fibers 12, so that breakage of the fibers 12 can be minimized during spinning and extraction. Alternatively, the fibers 12 may remain straight as they are being pulled away from the substrate 13 in the direction of arrows 16 to form a tow. Such a tow, e.g., also an aggregate of extended carbon nanotubes, like yarn 15, also include multiple points of contact between the carbon nanotubes.

Although illustrated to include a two-pole electrode 11, it should be appreciated that system 10 can be provided with a one pole or multiple-pole electrode 11. The employment of a two or multiple-pole electrode 11, in one embodiment, can result in more fibers 12 being collected from the large circular substrate 13, and may result in a yarn where more of the fibers 12 can be of similar length. It can be important to note that, in many applications, the length of the fibers 12 making up a yarn 15 (spun) or tow (straight) should be more or less similar in length. Otherwise the stress borne by this yarn 15 will be carried by the shortest fibers, which may then be subject to breakage when stress can be applied.

In addition to one electrode 11, the system 10 of the present invention may include a second electrode 17. This second electrode 17, in one embodiment, may be placed upstream of the substrate 13, and may be sufficiently porous to allow the reaction gas to pass through it to reach the substrate 13. One such suitable electrode may be made from a stainless-steel or carbon wire mesh, and may be placed, in an embodiment, substantially parallel to the plane of the substrate 13 adjacent its inlet side 131. This electrode 17 may be connected via a wire to electrical ground. Other material from which electrode 17 may be made includes a porous conductor, such as porous nickel foam, porous glassy carbon foam or the like.

Electrode 11, as shown in FIGS. 1A-B, may be placed downstream from the substrate 13. Its distance from the substrate 13 and the number of poles included thereon can determine how uniform the fibers lengths may be. Electrode 11, in one embodiment, may be suspended in the center of the chamber 16, and may be designed to rotate about its axis 113. Electrode 11 may be provided with one of several rotationally symmetric forms, for example, a cylinder or rod, a pointed needle or cone, or a rod with a number of poles or prongs emerging from the end facing the substrate and fibers. Of course, other rotationally symmetric forms may be used, so long as the electrode 11 may be capable of performing its intended purposes.

The description provided hereinafter will proceed with reference to an electrode 11 having a rod with two prongs 111 and 112, as illustrated in FIGS. 1A-B. Electrode 11, in one embodiment, may be caused to translate as the fibers 12 grow in length. One means of controlling this translation rate may be to monitor the leakage current in a high voltage power supply, and to control the distance of the electrode 11 from the substrate 13 in a manner to keep this leakage current constant.

Electrode 11, in accordance with an embodiment, can be formed from any electrically-conductive material, such as stainless steel or copper that can withstand the environment in the growth chamber 16. The tip(s) of the electrode 11, i.e., the prongs 111 and 112, on the other hand, may additionally be covered with a thin electrically-insulating material. In high temperature environments, the electrically insulating material used may be boron nitride or alumina. In low temperature environments, polymers, such as PTFE may be used.

Still referring to FIGS. 1A-B, a negative voltage may be placed on electrode 11, situated downstream of substrate 13, to generate an electric field (not shown) between itself and the upstream electrode 17, as well as across the growth substrate 13. In an embodiment, the electric field may be a relatively high strength field ranging from between about 100 V/m and about 10 kV/cm. In the vicinity of the tips of prongs 111 and 112 of electrode 11, the electric field, in one embodiment, may be anisotropic, having greater strength near the prongs 111 and 112 than between them. For the growth of the nanoscale fibers 12 (e.g., carbon nanotubes) it may be desirable to place the upstream electrode 17 at a positive potential and the downstream electrode 11 at a negative potential, in order to minimize field emission from the carbon nanotubes. In particular, the carbon nanotubes, having a very small radius of curvature at their tips, can consequently generate a very high field strength causing electrons to be emitted.

As the fibers 12 grow from the substrate 13, they may become polarized in the presence of the electric field. The polarization can help guide the fibers 12 along electric field lines away from the substrate 13 and to each of the prongs 111 and 112 of electrode 11. If a fiber 12 makes contact with the prongs 111 and 112 of electrode 11, weak forces, such as the van der Waal's bond, may promote continued contact with the prongs 111 and 112. Otherwise, the electric field acts to keep the tip of the fiber 12 in contact with the prongs 111 and 112 of electrode 11.

In one embodiment, a force may be provided which allows the fibers 12 (e.g., nanotubes) growing from a "base growth" mode to move unidirectionally and faster off of their growth sites on the substrate 13 than they would in the absence of such a force. The application of an electric field to growing nanotubes fibers 12 and fiber tension during subsequent spinning and uptake may provide such forces to enhance the nanotubes growth rate.

In another embodiment, it may be possible that multiple prongs may not be needed on the downstream electrode 11, and that one tip will be sufficient for collection and spinning of fibers. Other configurations of downstream electrode 11 may also work to spin the nanotube fibers, for instance, multiple poles, a rotating disc, or a configuration of multiple poles connected to a planetary gearing so that each one rotates about multiple axis. Alternatively, a rotating transverse rod, or those previously mentioned may all be potential embodiments of the electrode 11.

It should be appreciated that although system 10 is provided above, yarn 15 or tow generated from the extended length carbon nanotubes of the present invention can be generated by a number of other commercially available spinning and/or collection technologies, for example, air spinning, wet spinning, dry spinning, or a combination thereof.

The carbon nanotubes generated for use in connection with the present invention may be provided with certain characteristics. In accordance with one embodiment, diameters of the carbon nanotubes generated may be related to the size of the catalyst particles. In particular, the diameters for single wall nanotubes may typically range from about 0.5 nanometers (nm) to about 10 nm or more for single wall nanotubes, and from about 2 nm up to about 50 nm or more for multi-wall nanotubes. In addition, it should be noted that the nature of these carbon nanotubes, for instance, their metallic or semiconductor character, may correspond to their diameter, their chirality and/or their defects, if any. Accordingly, in order to control the nature or characteristic of these nanotubes, it may be necessary to control their dimensions with sufficient accuracy.

Moreover, the strength of the carbon nanotubes generated for use in connection with the present invention may be about 30 GPa maximum. Strength, as should be noted, can be sensitive to defects and to the diameter of the nanotubes. Thus, depending on the diameter and purity of the nanotubes generated, as well as the spinning of the nanotubes about one another, the strength of yarn 15 made from these nanotubes can be less than that of the tube strength. In an embodiment, strength values for yarn 15 may range from about 1 GPa to about 8 GPa. Elastic modulus of the carbon nanotubes fabricated for use with the present invention, on the other hand, may not be sensitive to defects and can vary from about 1 to about 1.5 TPa. However, because the nanotubes are spun about one another to form yarn 15, the elastic modulus of yarn 15 may be less than the elastic modulus of the individual nanotubes. In one embodiment, the elastic modulus for yarn 15 may range from about 100 GPa to about 700 GPa. Moreover, the strain to failure, which generally can be a structure sensitive parameter, may range from a few percent to about 10% in the present invention.

It should be appreciated that since each of the generated nanotubes may be grown from a catalyst particle, such as an iron catalyst, each nanotube may include a catalyst particle at one end, that is, the end from which growth was initiated. The presence of the catalyst particles within the spun yarn 15, therefore, can allow the yarn 15 to be visible, for instance, in an x-ray. The presence of iron catalysts can also serve to provide the yarn 15 with magnetic properties. Magnetic properties, of course, can be imparted when catalysts with magnetic properties are used. To the extent desired, the catalyst particles may be removed from the nanotubes prior to spinning them into yarn 15.

Once the yarn or tow (i.e., aggregate of carbon nanotubes) has been generated or obtained, such yarn or tow may be used for the construction of an apparatus, such as an antenna or sensor, for the transmission and reception of electromagnetic radiation.

Figure 2:
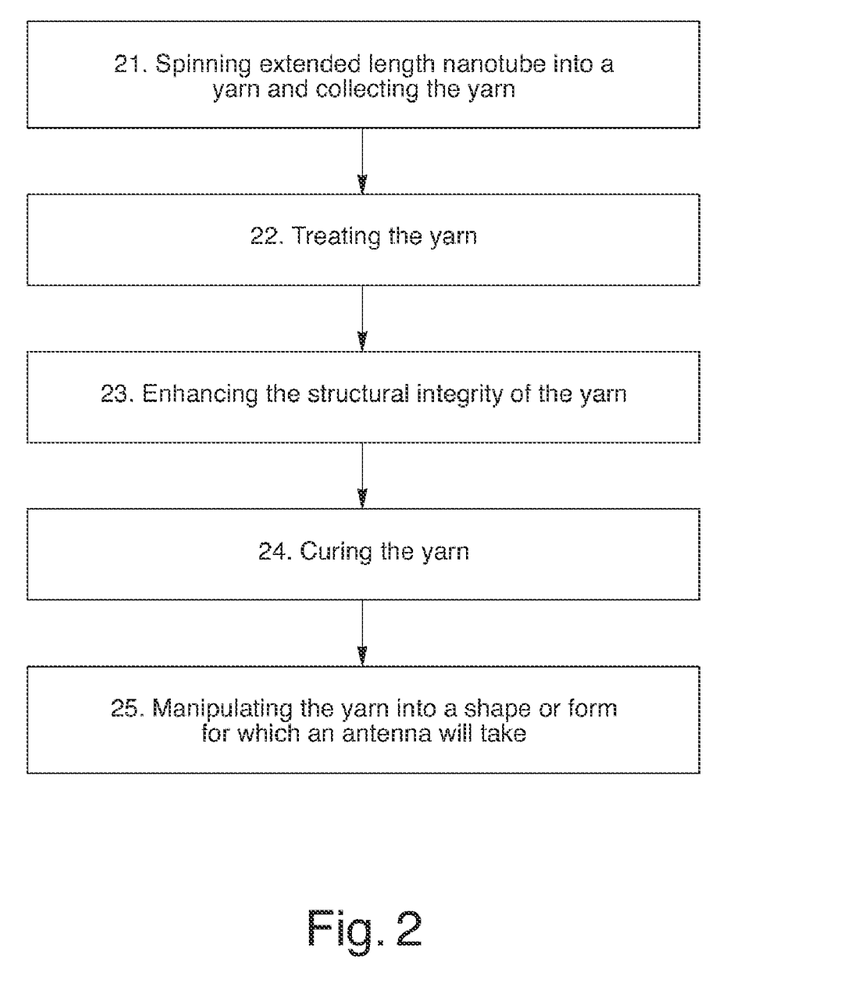
FIG. 2 illustrates a method for the synthesis of antennas made from continuous, extended length nanotubes of the present invention.

Looking now at FIG. 2, there is illustrated a method for manufacturing an antenna in accordance with an embodiment of the present invention. Initially, continuous, extended length nanostructures, such as carbon nanotubes, may be synthesized using a processes disclosed above, and subsequently spun into a yarn and collected 21. It should be noted that the extended length nanotubes can be generated by the process of the present invention to be from a few nanometers to upward of 40 centimeters or more. However, by spinning these nanotubes together and allowing the ends of these nanotubes to overlap, as discussed above, a yarn of any particular length, for example, from about 10 centimeters or less up to many meters or tens of meters or more, can be generated. As for its diameter, the spun yarn may be provided with a diameter ranging from about a few nanometers to about 1 millimeter or more. The collected yarn generated by the method of the present invention, in an embodiment, can have a controlled number of contact points between the nanotubes to permit transmission of electromagnetic radiation along the antenna to be formed.

Next, the yarn, in one embodiment, may be treated 22 with a compound, such as a polymeric resin, to facilitate the subsequent formation of structure for use as an antenna. In accordance with one embodiment, treatment of the yarn may be accomplished by, for instance, spraying, blotting, coating or dipping. Such treatment, in an embodiment, can result in the dispersal and/or infiltration of the polymeric resin throughout the yarn. Examples of a polymeric resin for use in the treatment of the yarn include RESOL, furfuryl alcohol, polyamide, epoxy, Krayton, polyethylene, PEEK (polyaryletherketone) resin, other commercially available resins, or a combination thereof. It should be noted that although the yarns may be treated at this stage, the extended length nanotubes may be treated with such a compound prior to spinning the nanotubes into a yarn.

The structural integrity of the treated yarn may thereafter be enhanced 23. In particular, the treated yarn may, in an embodiment, be hot pressed to allow bonding between adjacent extended length carbon nanotubes into a formed mass. The pressing, in one embodiment, may be done at a temperature range of from about 125° C. to about 350° C., and at a pressure of at least about 3000 psi for approximately 10 minutes or until bonding of the carbon nanotubes occurs. By pressing in such a manner, the polymeric resin may infiltrate voids between overlapping carbon nanotubes and permit the carbon nanotubes in the yarn to bond with one another to provide a malleable mass or structure. If desired, the pressing can be done in a mold to permit the mass or structure to take the shape of a desired antenna at this point. Again, the temperature, pressure and length of time can be dependent of the type of resin selected. Should it be desired, this process may also be carried out within a vacuum environment.

Once bonded, the carbon nanotubes in malleable mass may be subject to pyrolysis for curing 24. In particular, the malleable mass may be subject to slowly increasing temperature, for instance, less than 1 degree C. per minute, in an inert atmosphere, such as argon or helium. In an embodiment, the curing temperature may be raised to at least between about 1000° C. and about 1500° C. This slow heating rate, in one embodiment, allows water, a primary fluid by-product of the reaction, to diffuse out of the malleable mass and permits the mass to be cured.

Thereafter, this cured or pyrolyzed mass may be manipulated 25 into a shape of a final product, e.g., an antenna. In an embodiment, the mass may be hot pressed over or into a mold into the shape of an antenna, and may be further pyrolyzed for final curing. Specifically, the mass may be subject to a final ramp temperature up to about 1500° C. to anneal (i.e., remove any defects) the mass in its desired shape for use as an antenna.

It should be appreciated that rather than molding, the cured or pyrolyzed mass may be manipulated by other means into a shape or form for which the antenna may take. Manipulation of the yarn may include twisting, pulling, coiling, stretching, tugging, shrinking, intertwining, or flexing. To the extent desired, the yarn, in one embodiment, may initially also be colored, styled or provided with various designs required by the particular antenna design.

Although disclosed above as being constructed from continuous extended length nanotubes, the antenna of the present invention may also be manufactured from relatively shorter length nanotubes, for instance 10 microns to 500 microns. In particular, these relatively short length nanotubes may first be synthesized using a method of the present invention. Next, these relatively shorter length nanotubes may be bonded to one another in series to form an extended length nanotube structure. Bonding may be accomplished by twisting and/or by addition of a bonding agent. Examples of a bonding material for use in connection with this embodiment include RESOL, furfuryl alcohol, polyamide, epoxy, Krayton, polyethylene, PEEK (polyaryletherketone) resin, other commercially available resins, or a combination thereof. A plurality of these extended nanotubes may thereafter be spun into a yarn and manipulated into an antenna.

It should be appreciated that the yarn (i.e., aggregate of nanotubes) may alternatively be formed and collected without treating the nanotubes with the polymeric resin referenced above. Since conduction in nanotubes may essentially be along the surface, minimizing surface coatings, such as resin or the like, or dispersal of resin within the yarn, in certain application, can enhance the ballistic conduction. In such an embodiment, the integrity of the yarn (i.e., aggregate of nanotubes) can be maintained through interaction of intermolecular forces, such as van der Waal's force, between adjacent nanotubes. Once formed and collected, the yarn may thereafter be manipulated, using any of the approaches noted above, into a form or shape for which the antenna may take.

To the extent that an antenna of substantial girth may be needed, or its strength needs to be increased, a plurality of yarns positioned in substantial parallel relations to one another may be plied (i.e., aggregated) with one another prior to shaping and forming the antenna. These yarns, as provided above, can be made from continuous extended length nanotubes or from relatively shorter nanotubes bonded in series. To maintain the yarns as an aggregate, the yarns, in one embodiment, may be bonded to one another by a bonding material. For instance, RESOL, polyamide, epoxy, Krayton, polyethylene, PEEK (polyaryletherketone) resin, other commercially available resins, or a combination thereof may be used as a bonding material. Alternatively, aggregates of yarns may be formed by allowing intermolecular forces, such as van der Waal's force, to interact between The antenna manufactured using the extended length nanotubes of the present invention can withstand very high temperatures during reception and transmission of electromagnetic radiation. In general, the higher the amount electrical currents passing through an antenna, the higher the amount heat that will be generated in the antenna. When the amount of heat exceeds the temperature at which the antenna can withstand, the antenna and its components can be damaged or destroyed. In the present invention, the extended length nanotubes comprising the antennas can have the ability to withstand relatively high temperatures, for instance, temperatures in excess of 1500° C. without degrading.

Moreover, because these extended length nanotubes can be provided with substantially high current carrying capacity a relatively minimal amount of heat will be generated within the antenna, resulting in an antenna with a minimal thermal signature. The ability to minimize the thermal signature can be particularly useful, for instance, in military applications, such as those associated with aircraft and vehicles, so as to avoid heat emission detection.

At high frequency it is expected that the carbon nanotubes of the present invention would exhibit much less resistivity than comparable antennas fabricated from copper wire. This advantage should occur at frequencies above 100 MHz and become even more distinct in the GHz frequency ranges, for example, from about 500 MHz to about 100 GHz.

In addition to these benefits, since the carbon nanotubes of the present invention is of relatively high strength (~30 GPa), has a strain to failure ratio of (~10%) and low density (~1.8 g/cc) compared with copper (8.9 g/cc), these carbon nanotubes can provide a much lighter and stronger antenna system than that exhibit by copper.

The antennas manufactured using the extended length nanotubes of the present invention can also suppress the occurrence of surface currents, so as to minimize signal distortion and heat generation, all of which can substantially improve transmission and reception of electromagnetic signals. In general, the surface current is proportional to the diameter of the electrical conductor (e.g., a wire). However, since the conductor in this case is a yarn or unidirectional made from extended length nanotubes, its diameter is a small 1 to 10 nm. As a result, the yarn can act like an extreme Litz wire, i.e., a copper wire bundle of very small diameter wires, but much more effective in suppressing surface currents. By minimizing the occurrence of surface currents, the occurrence of signal distortion, including phase shifts, as well as heat generation within the antenna can be minimized. Signal distortions can be further minimized by the selective use of nanotubes of the metallic type.

The antennas manufactured using the extended length nanotubes of the present invention can exhibit ballistic conduction in order to be substantially sensitive to low-level electromagnetic radiation. Generally, during normal conduction, electrons can be scattered by impurities, vacancies and thermal vibration of the atoms in the conductor. Since conduction in nanotubes is essentially along the surface, minimizing surface coatings will enhance the ballistic conduction. Any scattering reduces the speed and momentum of the electrons traveling length the conductor and gives rise to resistivity. In particular, the nanotubes of the present invention can permit a single electron to go from one end of an extended length nanotube to the other without being scattered, also known as ballistic conduction. Moreover, the ballistic path of an electron at room temperature is about 100 microns. As such, the length of the nanotubes used in connection with the present invention, in one embodiment, may need to be at least this length, and preferably longer than 500 microns. Moreover, these extended length nanotubes can maintain such ballistic conduction in the presence of a relatively low level electromagnetic field. As a result, the extended length nanotubes can be designed for sensitive detection of electromagnetic radiation.

The antennas manufactured using the extended length nanotubes of the present invention can also be provided, in an embodiment, with near superconductor like transmission, resulting in improving efficiency during the reception and transmission of electromagnetic radiation. Normally, conductors suffer from the loss of some energy when electricity is transmitted therethrough. To minimize energy loss, these conductors can be cooled below liquid nitrogen temperature. However, the nanotubes of the present invention need not be cooled to minimize the energy loss during conduction. As a result, they can improve the transmission efficiency of the antenna.

The extended length nanotubes of the present invention can provide a much stronger, lighter, and flexing antenna system for the reception and transmission of electromagnetic radiation. The very high strength of carbon nanotubes (~30 GPa) made from the process of the present invention can be many times stronger than steel. Furthermore, carbon nanotubes can have a low density (1.8 g/cc) compared with copper (8.9 g/cc) resulting in a substantially lighter antenna. In fact, carbon nanotubes are lighter than aluminum, i.e., about 30% lighter by weight than aluminum. Finally, the carbon nanotubes can have a high strain to failure (10%) or strong ability to flex.

The extended length nanotubes of the present invention can withstand extremely corrosive environments. Because of their ability to resist to ultraviolet radiation damage, the nanotubes of the present invention can be relatively more durable than other polymeric materials. Furthermore, the nanotubes of the present invention may be anti-corrosive in nature, thereby allowing them to be employed underwater, in a high salt environment, as well as in high radiation or hazardous environments without jeopardizing their structural integrity.

In addition to being used as a stand alone antenna, the extended length nanotubes of the present invention can be woven to form fabric or cloth, or woven or embedded into a variety of materials. In an embodiment, by interlacing these extended length nanotubes into these materials, these materials can have functionalities and characteristics similar to those of an antenna. The materials within which the extended length nanotubes of the present invention may be embedded includes traditional textiles, cloth, threads, fabric, clothing, tents, fabric vehicle covers, blankets, prepregs, tapes, or tows. In addition, by weaving and making these extended length nanotubes an integral part of a surrounding material, the structural integrity of the material may also be enhanced. Alternatively, nanotubes can be used as a unidirectional material for antennas whose length is on the order of the length of the nanotube.

Alternatively, the nanotubes of the present invention can be used as a unidirectional material for antennas whose length can be on the order of the length of the nanotube. In other words, a plurality of shorter length nanotubes may be arranged unidirectionally (e.g., oriented in one direction) in an array, such that the plurality of nanotubes simulate a bristle on a brush. In such an arrangement, the nanotubes may be arranged in such a manner so as to minimize contact with one another.

Furthermore, preformed loops of yarn spun from the extended length nanotubes of the present invention may be embedded or woven into exterior linings of a various structures, such as the non-metallic exterior lining of a motor vehicle or airplane for the reception and transmission of electromagnetic radiation. The existence of such preformed loops in these structures can also enhance their structural integrity.

Alternatively, the extended length nanotubes of the present invention may be synthesized for use as electrodes in conformal arrays, or as an array of antennas that can be tuned to precise wavelengths, that is, the arrays can be tuned to transmit and receive electromagnetic radiation at different frequencies. Such an array can be configured as a shield from electromagnetic radiation, or alternatively can be used to transmit electromagnetic radiation. The shielding, in an embodiment, can be designed to be frequency selective, for instance, by controlling the characteristics of the antenna. Such an array can also be provided with different length aggregates within the array, so as to permit the array to be tuned for transmitting and/or receiving electromagnetic radiation at a variety of frequencies.

These arrays, like the antennas referenced above, can have substantially high current carrying capacity with minimal thermal signature, as well as capable of sensitively detecting electromagnetic radiation in substantially low electromagnetic fields. These arrays, in an embodiment, may be embedded or woven into a variety of materials, including the exterior linings, structural skin or member of, for instance, epoxy fiber glass, carbon fiber, metal, cloth or textile. The presence of the arrays in these structures can provide these structures with the ability to transmit and receive electromagnetic radiation, as well as enhancing their structural integrity.

In addition to the above, the extended length nanotubes of the present invention may be fabricated into additional structures or apparatus with the capacity to transmit and receive electromagnetic radiation. Such structures can be, for example, a waveguide, a nanotube array, or an antenna array. These structures may exhibit similar characteristics to those of the antennas described above, including surface current suppression, ballistic conduction, high current carrying capacity, and minimal thermal signature. In addition, these structures can be embedded or woven into textiles and/or metals for the reception and transmission of electromagnetic radiation, as well as enhancing the structural integrity of these structures.

While the invention has been described in connection with the specific embodiments thereof, it will be understood that it can be capable of further modification. For instance, instead of carbon nanotubes or extended length nanostructures may be used. Furthermore, this application may be intended to cover any variations, uses, or adaptations of the invention, including such departures from the present disclosure as come within known or customary practice in the art to which the invention pertains.

What is claimed is:

1. An antenna comprising:
   a body portion;
   an aggregate of extended length nanotubes along the body portion; and
   a plurality of contact points between adjacent nanotubes to permit transmission of electromagnetic radiation while reducing resistivity at a high frequency.

2. An antenna as set forth in claim 1, wherein the body portion is flexible to permit weaving or embedding of the antenna into fabric, cloth or any other materials.

3. An antenna as set forth in claim 1, wherein the body portion has a design that includes one of an elongated shape, a loop shape, any geometric shape, or a combination thereof.

4. An antenna as set forth in claim 1, wherein the aggregate has a length ranging from a few nanometers to a over 1 meter or more.

5. An antenna as set forth in claim 1, wherein the extended nanotubes in the aggregate has a length ranging from about a few nanometers to over 40 centimeters or more.

6. An antenna as set forth in claim 1, wherein the nanotubes in the aggregate are formed by a plurality of relatively short length nanotubes bonded in series to one another.

7. An antenna as set forth in claim 1, wherein the nanotubes in the aggregate have relatively high current carrying capacity.

8. An antenna as set forth in claim 1, wherein the nanotubes in the aggregate have the ability to transmit and receive high frequency electromagnetic radiation.

9. An antenna as set forth in claim 8, wherein the electromagnetic radiation has a frequency above 100 MHz.

10. An antenna as set forth in claim 1, wherein the nanotubes in the aggregate can enhance ballistic conduction, so as to be substantially sensitive to low-level electromagnetic radiation.

11. An antenna as set forth in claim 1, wherein the nanotubes in the aggregate can suppress surface currents, so as to minimize signal distortion.

12. An antenna as set forth in claim 1, wherein the nanotubes in the aggregate can minimize thermal signature during reception and transmission of electromagnetic radiation.

13. An antenna as set forth in claim 1, wherein the nanotubes in the aggregate can withstand a corrosive environment.

14. An antenna as set forth in claim 1, wherein the nanotubes in the aggregate include a catalyst particle from which they were formed.

15. An antenna as set forth in claim 14, wherein the aggregate has properties.

16. An antenna as set forth in claim 1, wherein the nanotubes in the aggregate are without a catalyst particle from which they were formed.

17. An antenna as set forth in claim 1, wherein a plurality of aggregates form an array on the body portion.

18. An antenna as set forth in claim 17, wherein the array can be tuned to transmit and receive electromagnetic radiation at different frequencies.

19. An antenna as set forth in claim 1, further including a resin material to maintain integrity of the aggregate.

20. An antenna as set forth in claim 19, wherein the resin material includes one of a RESOL resin, furfuryl alcohol, a polyamide resin, an epoxy resin, Krayton resin, polyethylene resin, polyaryletherketone resin, or a combination thereof.

21. An antenna as set forth in claim 1 designed for use as a sensor.

22. A method for manufacturing an antenna, the method comprising:
   providing a plurality of extended length nanotubes;
   aggregating the plurality of nanotubes, so as to provide a plurality of contact points between adjacent nanotubes to permit transmission of electromagnetic radiation while reducing resistivity at high frequency; and
   manipulating the aggregate into a desirable shape for use as an antenna.

23. A method as set forth in claim 22, wherein the step of providing includes generating the extended length nanotubes using Chemical Vapor Deposition (CVD).

24. A method as set forth in claim 22, wherein the step of providing includes maintaining at one end of the nanotube a catalyst particle from which the nanotube grew.

25. A method as set forth in claim 22, wherein the step of providing includes removing from the one end of the nanotube a catalyst particle from which the nanotube grew.

26. A method as set forth in claim 22, wherein the step of aggregating includes spinning the plurality of nanotubes into a yarn.

27. A method as set forth in claim 22, wherein the step of aggregating includes pulling the plurality of nanotubes into a tow.

28. A method as set forth in claim 22, wherein the step of aggregating includes arranging the plurality of nanotubes in an array on a surface.

29. A method as set forth in claim 22, wherein the step of aggregating includes allowing adjacent nanotubes to interact with one another through intermolecular forces to maintain the integrity of the aggregate.

30. A method as set forth in claim 22, wherein the step of manipulating includes one of molding, twisting, pulling, coiling, stretching, tugging, shrinking, intertwining, flexing, any other methods of shaping, or a combination thereof.

31. A method as set forth in claim 22, further including:
   treating the aggregate of nanotubes with a resin material;
   placing the treated aggregate in an inert atmosphere; and
   exposing the treated aggregate to a temperature range of from about 1000° C. to about 1500° C. to transform the treated aggregate into a malleable mass.

32. A method as set forth in claim 31, wherein the step of treating includes one of dispersing or infiltrating the resin material throughout the aggregate.

33. A method as set forth in claim 31, wherein the step of treating includes one of spraying, blotting, coating, or dipping.

34. A method as set forth in claim 31, wherein, in the step of treating, the resin material includes one of a RESOL resin, furfuryl alcohol, a polyamide resin, an epoxy resin, Krayton resin, polyethylene resin, polyaryletherketone resin, or a combination thereof.

35. A method as set forth in claim 31, wherein, in the step of placing, the inert atmosphere includes argon, helium, or other inert gases.

36. A method as set forth in claim 31, wherein the step of exposing includes raising the temperature at a rate of from less than 1° C to about 1° C. per minute.

37. A method as set forth in claim 31, further including subjecting the malleable mass to a final ramp temperature up to about 1500° C.

38. A method as set forth in claim 22, further including weaving the aggregate to form a fabric or cloth.

39. A method as set forth in claim 22, further using the aggregate as one of a sensor, a waveguide, or an antenna array.

40. A method as set forth in claim 22, further including embedding the aggregate into another material, including one of textiles, cloths, threads, fabrics, clothing, tents, vehicle covers, blankets, prepegs, tapes, tows, exterior linings, epoxy fiber glass, carbon fibers, metals, or metal alloys.

41. A method as set forth in claim 22, further including using the antenna to transmit and receiving electromagnetic radiation at frequencies above 100 MHz.

* * * * *